(12) United States Patent
Ito et al.

(10) Patent No.: US 6,244,015 B1
(45) Date of Patent: Jun. 12, 2001

(54) METHOD OF ASSEMBLING PLANT

(75) Inventors: Arata Ito; Shuji Hirono; Motohiko Kimura, all of Yokohama; Shigeru Kyoda, Chigasaki; Hitoshi Sato, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/132,490

(22) Filed: Aug. 11, 1998

(30) Foreign Application Priority Data

Aug. 11, 1997 (JP) .................................................. 9-216246

(51) Int. Cl.⁷ ............................................................ G06F 1/00
(52) U.S. Cl. .................................... 52/741.01; 52/745.05
(58) Field of Search .............................. 348/82, 86, 143; 52/741.1, 745.05, 749.1, 750

(56) References Cited

U.S. PATENT DOCUMENTS

| | | | | |
|---|---|---|---|---|
| 3,735,352 | * | 5/1973 | Pease | 250/106 |
| 3,815,091 | * | 6/1974 | Kirk | 340/147 |
| 5,048,077 | * | 9/1991 | Wells et al. | 379/96 |
| 5,305,244 | * | 4/1994 | Newman et al. | 364/708.1 |

FOREIGN PATENT DOCUMENTS

| | | | |
|---|---|---|---|
| 3706325 | * | 9/1988 | (DE) . |
| 2152508 | * | 6/1983 | (GB) . |
| 9-114543 | | 5/1997 | (JP) . |

\* cited by examiner

*Primary Examiner*—Richard Chilcot
(74) *Attorney, Agent, or Firm*—Foley & Lardner

(57) ABSTRACT

A method of assembling a large-size plant and an assembling method for reducing a term of work are disclosed. Each of a crane operator in a crane operation room and site workers in a plant construction site is equipped with a picture I/O device and a voice I/O device. The crane operator and the site workers assemble the plant while sharing picture information of the picture I/O device and voice information of the voice I/O device with each other. A site remote control room vicinal to the plant construction site is connected via a radio transmission path to a host control center. The plant si assembled while the site workers, the crane operator room, the site remote control room and the central control room share the picture information and the voice information of their own with each other.

19 Claims, 11 Drawing Sheets

METHOD OF ASSEMBLING PLANT

FIELD OF THE INVENTION

The present invention relates to a method of assembling a plant to reduce a term of a plant construction work requiring a high-level technology and high construction expenditures as in the case of a light water cooling type nuclear power plant, or to reduce a periodical plant inspection time during its working period.

RELATED BACKGROUND ART

A construction of a light water cooling type nuclear power plant starts with an excavation down to a base rock, and involves a work of laying out a central mat and an outer peripheral mat thereon, a work of installing a reactor containment concrete vessel (RCCV) and a building outer peripheral structures on the respective mats, a work of subsequently installing a reactor pressure vessel (RPV) into the reactor containment concrete vessel and arranging a pipe system thereto, and a work of installing appliances in the building outer peripheral structure and arranging a pipe system thereto. When these works are finished, a commercial operation begins via a system test, a fuel charge and a start-up test. A term of work extending from the start of constructing the nuclear power plant to the start of the commercial operation may be as long as 60 months (5 years).

By contrast, a construction term of a gas turbine combined power plant may be approximately 36 months (3 years) shorter by approximately 24 months than the 60-months construction term of the nuclear power plant. Further, the nuclear power plant is complicated in terms of system and large of a quantity of the materials, and therefore requires large construction expenditures. Besides, the nuclear power plant adopts such a structure that the foundation is constructed directly on the base rock as a measure against an earthquake, and hence a term of excavation work tends to become long. Therefore, the construction of the nuclear power plant is disadvantageous in terms of an economic aspect because of an interest for the construction expenditures which will be produced for the long period of construction and a loss of profits which might be obtained by implementing a commercial operation. An electric power supplier incapable of raising large initial investment funds has a tendency not to select the nuclear power plant because of the initial construction expenditures being high even if the power production expenditures can be totally reduced due to comparatively low operation expenditures after constructing the nuclear power plant. Such being the case, if the construction term can be decreased, the initial investment funds can be, even if large, returned at an early stage, and therefore a strong desire for constructing the nuclear power plant might be invoked.

In the construction of a skyscraper in recent years, there has been adopted a construction method contrived to reduce the construction term by performing a ground work and an underground work in parallel with increases in size and depth of the underground structure.

With an insight into a decreasing tendency of the working population, there will be, it is predicted, increased a demand for performing the work depending on inexperienced man power, the aged and female laborers. In this case, it is required to introduce such a construction system that a mass production becomes attainable by adopting a belt-conveyor based flow production system for assembling, e.g., an automobile and employing the inexperienced laborers suited to this system. It is also necessary to provide a working environment which is much easier to work with a less proportion of physical labor.

At present, a progress of the semiconductor technology is so fast, and a high-performance microcomputer can be commercially available. The situation is that a system capable of transmitting multi-information including picture information is going to be readily obtained at a low price. In the majority of cases, a construction work or a periodical inspection work of the plant during its operation is carried out in cooperation, and it is of importance in terms of enhancing an work efficiency to share the information. In such a case, it is effective in terms of enhancing the work efficiency to share the picture information because of easily obtaining a recognition about an object to which the attention is paid. It has been difficult technically and in terms of the price to obtain the picture information, however, this obtainment is going to be possible with the progress in the electronic technology in recent years. The technology relative to the picture information is effective in extending a capability of a manager, and it is feasible to proceed the cooperative work among a multiplicity of inexperienced laborers by utilizing this technology, which can further enhance the work efficiency.

At present, there is developed a technology aiming at improving an availability factor by reducing the periodical inspection period of a light water cooling type nuclear power plant, whereby the periodical inspection period having hitherto required 60 days (2 months) or longer is going to be decreased down to approximately 20 days. What constitutes a principal critical path during the periodical inspection period of the reactor system in the nuclear power plant, is a fuel handling work and a control rod driving mechanism handling work. For reducing the terms of these works, a remarkable reduction in the periodical inspection period is attained by performing the works in parallel, conducting the works with an exchange for preparatory parts at a time other than the periodical inspection period and speeding up a handling work machine. Further, a one-day unit working process management having hitherto been adopted is changed to an hour-unit management system, or a 3-shift 24-hours working system is adopted, and the work waiting time is obviated, whereby the reduction in the working time is going to be attained. From now into the future, it is a vital technical matter to enhance the efficiency of the cooperative work between a site work manager, site workers and a crane operator.

When speeding up the fuel handling work and the control rod driving mechanism handling work, a plurality of works are combined to constitute one work, and hence there might arise a necessity for executing a minute- or second-unit time management for the work having hitherto used the hour-unit time management in order to speed up the work. A judgement of the worker and a work of transmitting the information are to be done in between a combination of the plurality of works, and it is therefore an important matter to reduce a time of the worker making the judgement and a time of transmitting the information in the minute- or second-unit time management. Among the work items of the periodical inspection of the reactor system which exclude the fuel handling work and the control rod driving mechanism handling work, the principal work item is a preparation work for installing and removing the work appliances. It is a vital matter to decrease the time of transmitting the information between the workers and the time of making the judgement in this preparation work. In the case of reducing the periodical inspection period by conducting the minute- or second-unit time management, it is required that this inspection period be reduced by supporting the fields relative to the capabilities of the workers.

SUMMARY OF THE INVENTION

It is a primary object of the present invention to provide a method of assembling a plant, which is capable reducing a term of construction work or a inspection period of a large-size plant such as a light water cooling type nuclear power plant.

It is another object of the present invention to provide a method of assembling a plant, which is capable of synthetically managing a construction work or an inspection of the large-size plant, of which the work is proceeded by a multiplicity of managers and workers in cooperation, and also capable of reducing a term of construction work or an inspection period of the large-size plant.

To accomplish the above objects, according to one aspect of the present invention, a method of assembling a plant comprises a step of making each of a crane operator in a crane operation room and a site worker in a plant construction site equipped with a picture I/O device and a voice I/O device, a step of performing a work of assembling the plant while the crane operator shares picture information of the picture I/O device and voice information of the voice I/O device with the site worker, a step of connecting a site remote control room proximal to the plant construction site to a host control center via a radio transmission path, and a step of assembling the plant while the site worker, the crane operation room, the site remote control room and the control center share the picture information and voice information of their own with each other.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
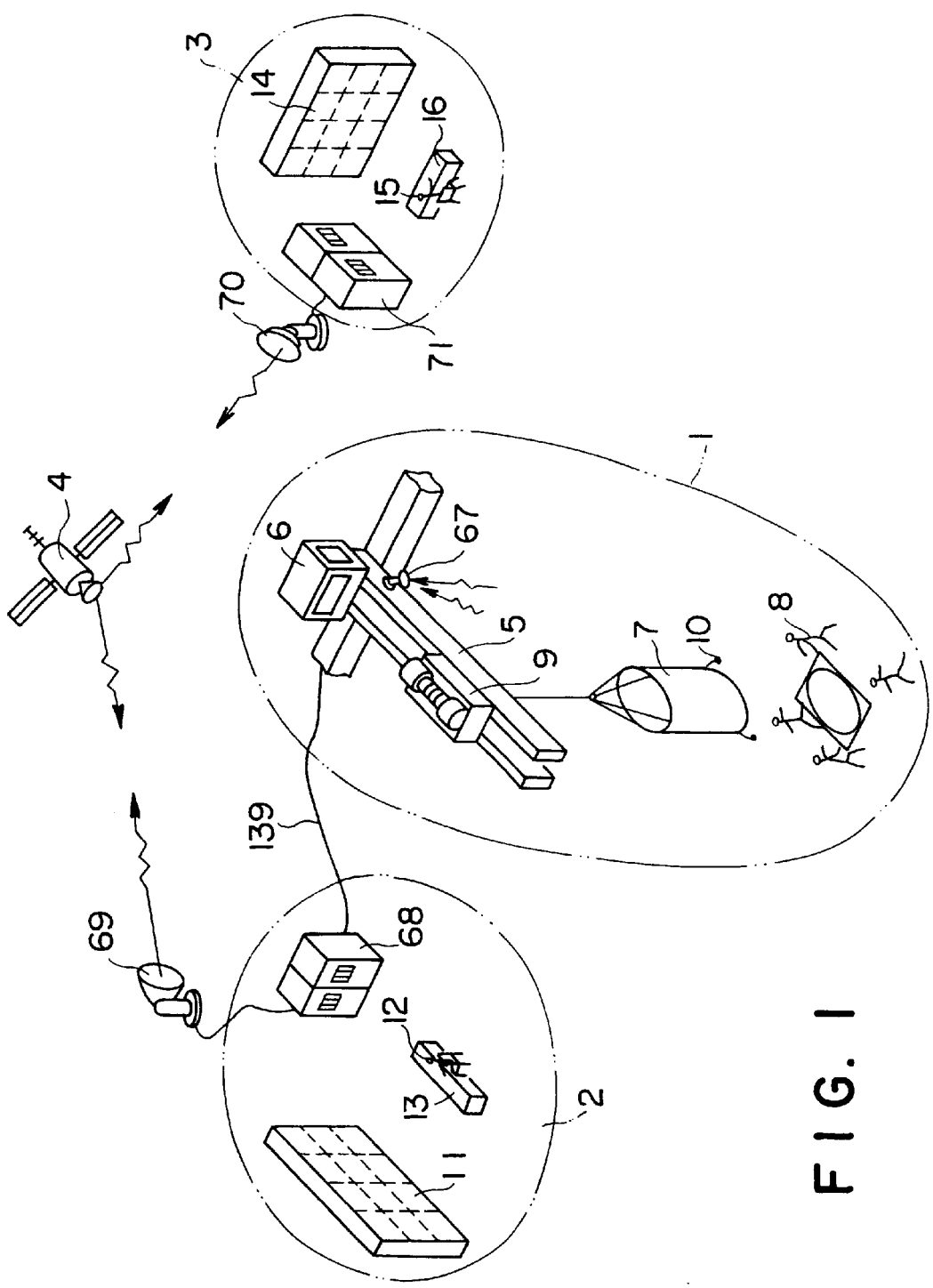
FIG. 1 is an explanatory view of a system architecture, showing a working method carried out sharing picture information according to the present invention.

FIG. 1 is an explanatory view of a system architecture, showing a working method according to the present invention which is carried out involving the use of vide information. Illustrated in FIG. 1 is a working site in which a plant is constructed by using a crane , a site remote control room 2, and a control center 3. Information can be exchanged between the site remote control room 2 and the control center 3 via a communication satellite 4. The working site 1 is equipped with a ceiling crane 5 having an operation room 6, in which an installation unit 7 is installed by use of the ceiling crane 5. A plurality of site workers 8 are posted in an installation site. An operator (not shown) who operates the ceiling crane 5 is stationed in the operation room 6. Each of the site workers 8, as will be described later on, must wear a helmet equipped with a TV camera and a line-of-sight detector, and carries a portable monitor TV. The helmet is fitted with a tag of a worker's name, or a peculiar label as a substitute therefor, or alternatively a self-position measuring unit. The installation unit 7 is attached with a TV camera 10 using a battery type CMOS sensor and a self-position measuring device. Picture information given from the TV camera 10 and self-position information from the self-position measuring device, are wirelessly transmitted to an antenna 67. The ceiling crane 5 is fitted with a TV camera 9 for imaging the installation unit 7.

The picture information obtained by the TV camera of the site worker 8 and line-of-sight position information obtained by the line-of-sight detector, are wirelessly transmitted a transportable side information relay device 42 (unillustrated) installed in the vicinity of the working site, and further wirelessly transmitted from the side information relay device 42 to the antenna 67. These pieces of information are then transmitted from the antenna 67 to a an image processor (not shown) installed in the operation room 6 of the ceiling crane 5. The image processor synthesizes images obtained through the TV cameras 9, 10 with the line-of-sight position information on the operator in the operation room 6, thereby creating a synthetic image with the line-of-sight position information. This synthetic image is transmitted to the portable monitor TV of the site worker 8 via the site information relay device 42 from the antenna 67.

Further, the synthetic image is also transmitted to the site remote control room 2 via a transmission line 139. The site remote control room 2 is equipped with a large-size multi-screen 11, a computer system 68 and a console 13. A manager 12 sitting at the console 13 manages an installing work in the working side 1, schedules of transmitting design data for support and carrying materials while watching the images on the large-size multi-screen 11. It is assumed that the manager 12 puts on the line-of-sight detector. The synthetic image transmitted from the working site 1 is projected on the multi-screen 11, and the detection information of the line-of-sight detector of the manager 12 sitting at the console 13 is also synthesized and displayed thereon.

The line-of-sight position information of the manager 12 is transmitted to the image processor installed in the operation room 6 of the ceiling crane 5, and additionally synthesized with the synthetic image. The synthetic image projected on the multi-screen is displayed while being synthesized with a detected result of a light-of-sight position of a manager 15. The line-of-sight position information of the manager 15 is transmitted also to the image processor installed in the operation room 6 of the ceiling crane 5, and additionally synthesized with the synthetic image thereof and thus displayed.

The control center 3 is equipped with a large-size multi-screen 14, a computer system 71 and an operation table 16. The manager 15 sitting at the operation table 16 compares a working state at the working site 1 with design specifications and thus evaluates the working state while watching the synthetic image of the working site 1 which has been projected on the multi-screen 14, and modifies the design and reviews the arrangement for the materials. The information of the line-of-sight detector of the manager 15 sitting at the operation table 16 is synthetically displayed on the multi-screen 14. The line-of-sight position information of the manager 15 in the site remote control room 2 is transmitted to the image processor installed in the operation room 6 of the ceiling crane 5 as well as to the multi-screen 11 in the same room 2, and is additionally synthesized with the synthetic image.

Figure 2:
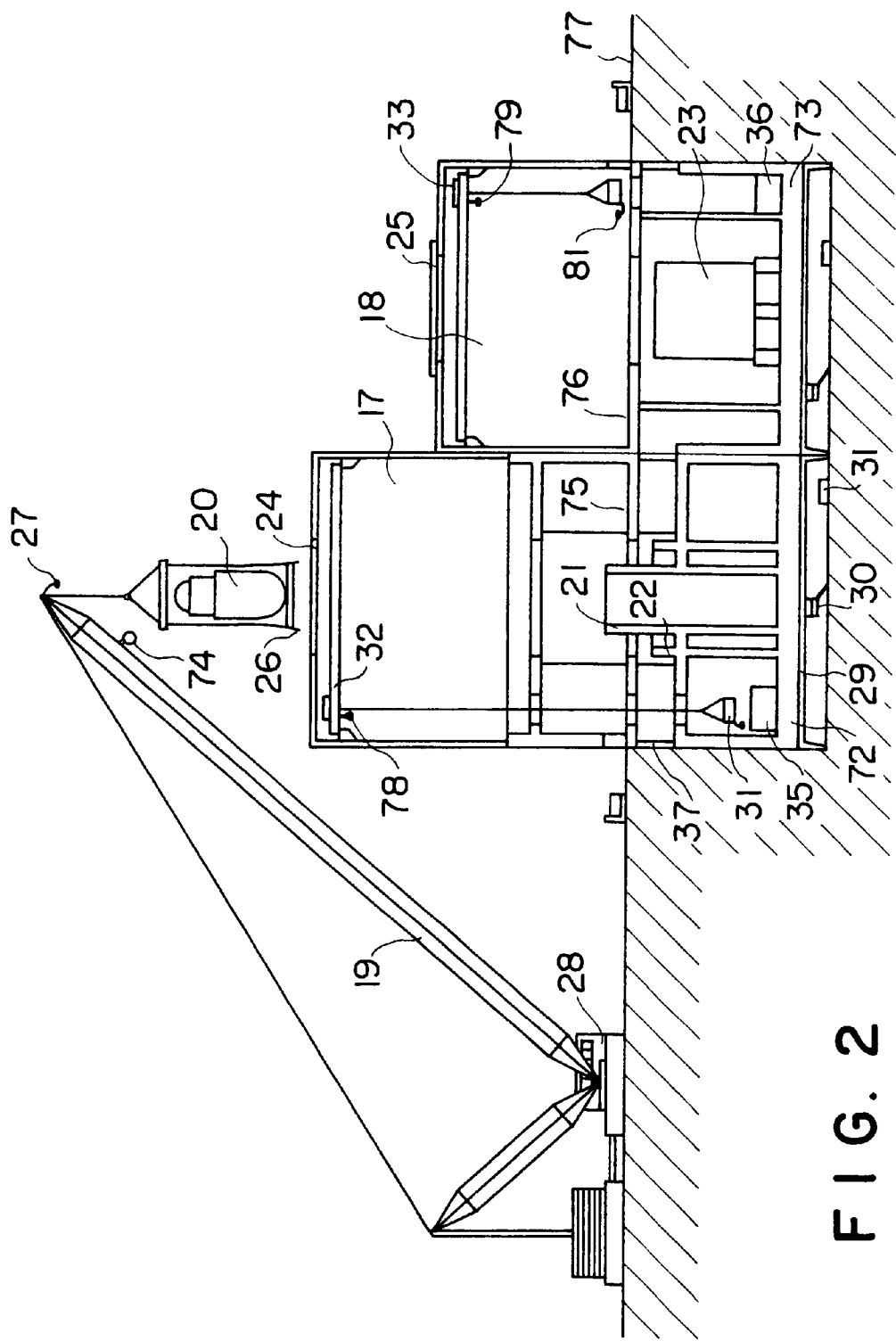
FIG. 2 is an explanatory view of a layout of appliances in a construction site, showing a situation in which a work of installing a reactor pressure vessel and an excavation work are conducted in parallel.

FIG. 2 shows a situation in which a reactor pressure vessel installing work and an excavation work are carried out in parallel. Shown herein as an example of installing a large-size assembly unit is a situation of how a reactor pressure vessel 20 is installed in a pedestal 21 of a nuclear reactor building 17 by use of a crawler crane 19. A battery type TV camera 26 for wirelessly transmitting the projected image and the self-position measuring device (not shown), are installed downwardly of the reactor pressure vessel 20. The crawler crane 19 is fitted with a TV camera 27 for imaging from above the reactor pressure vessel 20 suspended, and an antenna 74 for transmitting and receiving voice information and picture information wirelessly transmitted. A video signal received by the antenna 74 is transmitted to a picture/image processor (not shown) installed in an operation room 28 of the crawler crane 19.

The site workers (not shown) wearing the helmets provided with the TV cameras (CMOS sensor-assisted TV cameras or CCD cameras) and the line-of-sight detectors, stand by along the periphery of an upper edge of the pedestal 21. The video signals obtained by the imaging processes of the site workers and the line-of-sight position information given from the line-of-sight detectors thereof, are transmitted to the picture/image processor installed in the operation room 28 of the crawler crane 19 via the antenna 74. The picture/image processor generates a synthetic picture obtained by synthesizing pictures given from the TV cameras 26, 27, with video signals and line-of-sight position information which are obtained by the site workers and line-of-sight position information of an operator of the crawler crane 19. This synthetic picture is transmitted to the portable monitor TVs of the site workers as well as to the monitor TV in the operation room 28 of the crawler crane 19. This synthetic picture is transmitted also to the site remote control room 2 and the control center 3, and pieces of the line-of-sight position information of the managers 12, 15 are additionally synthesized with the synthetic picture according to the necessity.

Exemplified by way of one example of such a work that a building construction, installations of appliances, and an excavation work proceed in parallel, is a method of constructing bases 72, 73 on a caisson 29, then excavating the area under the caisson 29 while constructing the reactor building 17 and a turbine building 18 on the bases, and further sinking the caisson 29 corresponding to a progress of the excavation. The excavation of the area under the caisson 29 involves the use of a ceiling traveling type excavating device 30 and a crawler type excavating device (not shown), and surplus soil of the excavation is put into a surplus soil carry container 31 and raised above the ground surface by use of ceiling cranes 32, 33 via carry-in/carry-out devices 35, 36 secured to the caisson 29. The surplus soil is then loaded into the carrier device 34 and discharged into a surplus soil leaving place. When the surplus soil carry container 31 passes through the carry-in/carry-out devices 35, 36, the site workers posted thereabout and wearing the helmets attached with the TV cameras and the line-of-sight detectors conduct slinging works of the ceiling cranes 32, 33. When the surplus soil carry container 31 is mounted in the carrier device 34, the operator, putting on the helmet equipped with the TV camera and the line-of-sight detector, of the carry device 34 performs the slinging works of the ceiling cranes 32, 33. An operation room of the ceiling cranes 32, 33 is provided with a picture information processor for generating a synthetic picture by executing a process of synthesizing pictures of TV cameras 78, 79 fitted to the ceiling cranes 32, 33, pictures of TV cameras 80, 81 fitted to the surplus soil carry container 31 and pictures imaged by the site workers and the operator with the line-of-sight position information. This synthetic picture is transmitted to the monitor TV installed in the operation room of the ceiling cranes 32, 33 and to the portable monitor TVs of the site workers and the operator. The operator performs the carrying work of the surplus soil carry container 31 while watching the monitor TV.

Figure 3:
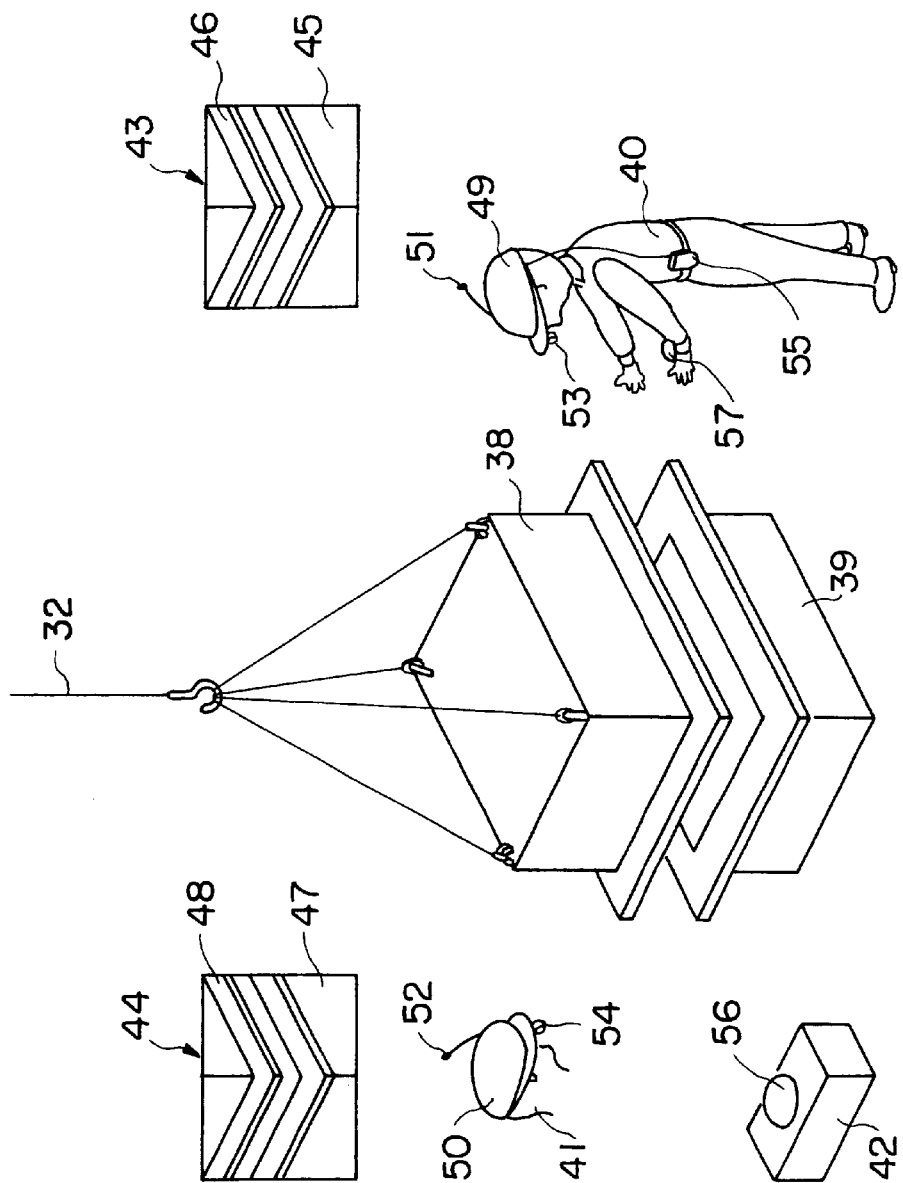
FIG. 3 is a view showing a state of the site in which to install a heavy structure sharing the picture information.

FIG. 3 illustrates a state of the site in which to install a heavy weight substance, sharing the picture information. FIG. 3 shows a state of site workers (A, B) 40, 41 putting on the helmets fitted with the TV cameras and the line-of-sight detectors, monitor how a first installation unit 38 is installed to an already-fixed second installation unit 39 by using the crane 32. Designated by the numerals 43, 44 in FIG. 3 are pictures of the installation units 38, 39 imaged by the TV cameras 53, 54. Pieces of picture information relative to the pictures 43, 44 and the line-of-sight position information of the site workers, are wirelessly transmitted to a installation site information relay device 42 via antennas 51, 52, and further wirelessly transmitted from the installation site information relay device 42 to an antenna (unillustrated) attached to the crane 32. The above picture information and the line-of-sight position information are then synthesized with the picture imaged by the TV camera fitted to the crane by the picture information processor installed in the operation room of the crane. The synthetic picture thereof is transmitted ti the monitor TV of the crane operation room and the portable TV cameras of the site workers 40, 41 via a reverse route. Helmets 49, 50 of the site workers 40, 41 are attached with antennas 51, 52. Peculiar identification labels are stuck to the tips of the antennas 51, 52 or the surfaces of the helmets, whereby the crane operator recognizes these labels by watching a picture of the TV camera fitted to the crane 32 and thus identifies the workers projected as a synthetic picture thereon. As the case may be, the site workers 40, 41 carry the self-position measuring devices, the self-position measuring device is also fitted to the installation unit, wherein the self-position information may be used for synthesizing the projected picture of the worker with the picture of the installation unit.

Figure 4:
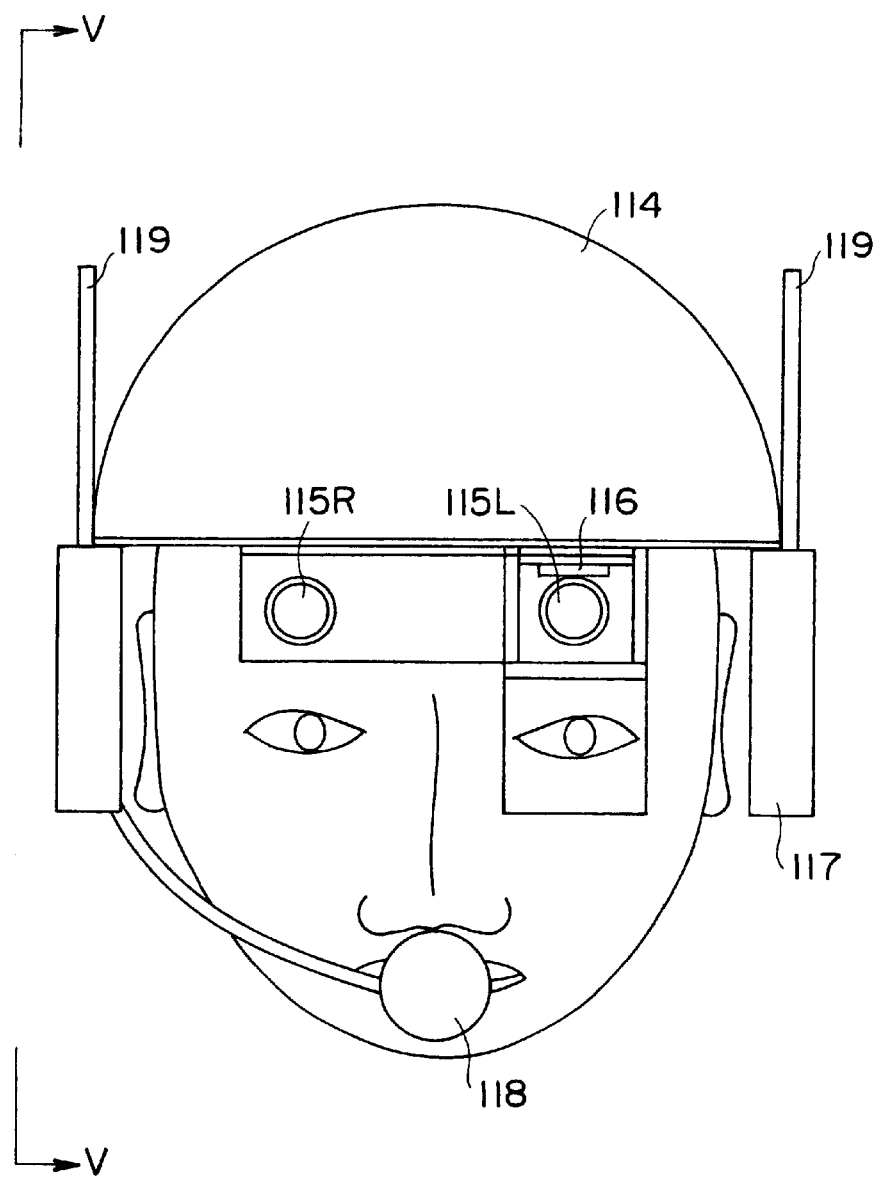
FIG. 4 is a front view showing a state where a site worker wears a helmet equipped with a picture information terminal device and a voice terminal device.
Figure 5:
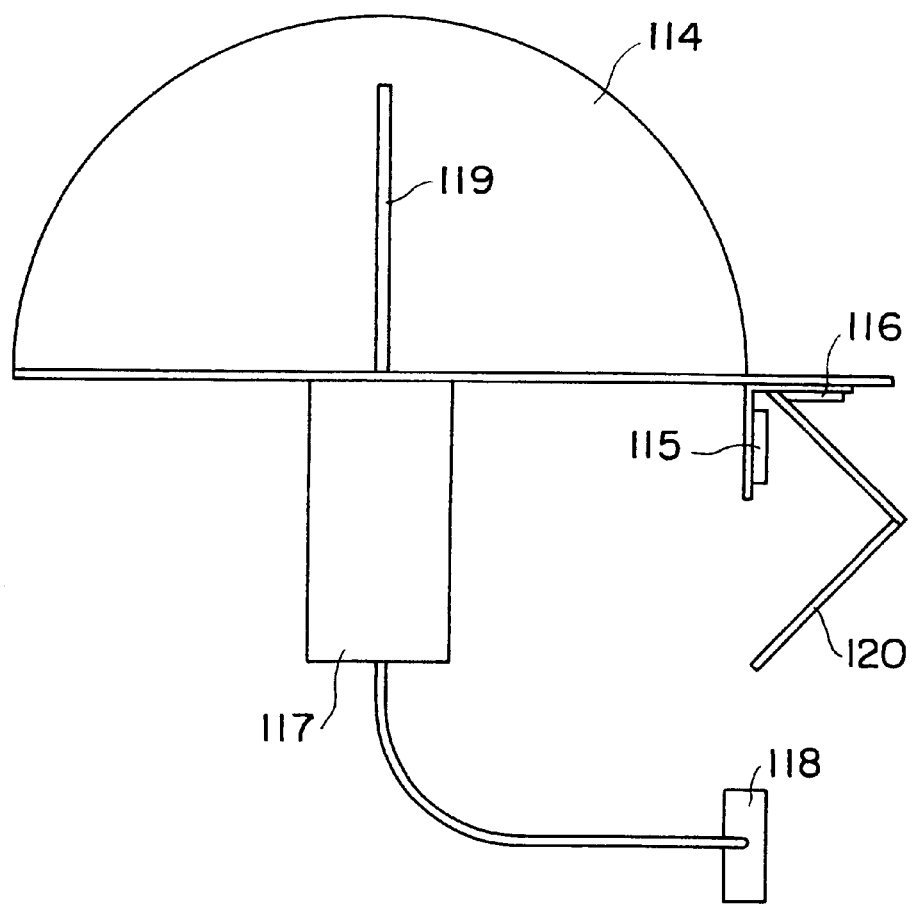
FIG. 5 is a side view taken along the line V—V in FIG. 4.

FIG. 4 is a front view showing a state where the site worker or the crane operator wears a helmet 114 equipped with a pair of stereoscopic vision TV cameras 115L, 115R, a line-of-sight detector 116, a headphone 117 and a microphone 118. FIG. 5 is a side view as viewed in the direction of the line V—V in FIG. 4. The TV cameras 115L, 115R, the line-of-sight detector 116, the headphone 117 and the microphone 118 are connected via unillustrated signal lines and power lines, wherein signals are transmitted and received via an antenna 119 fitted to the headphone 117. Near infrared rays are irradiated from the line-of-sight detector 116 and pass through as well as being reflected by a semi-transparent mirror 120 of which the surface is treated to transmit and reflect the near infrared rays. The near infrared rays thereby fall upon an eyeball of the worker or the operator, whereby a virtual image is formed inside a cornea thereof. The semi-transparent mirror 120 transmits visible light, and hence the site worker and the crane operator are able to directly see the object.

Figure 6:
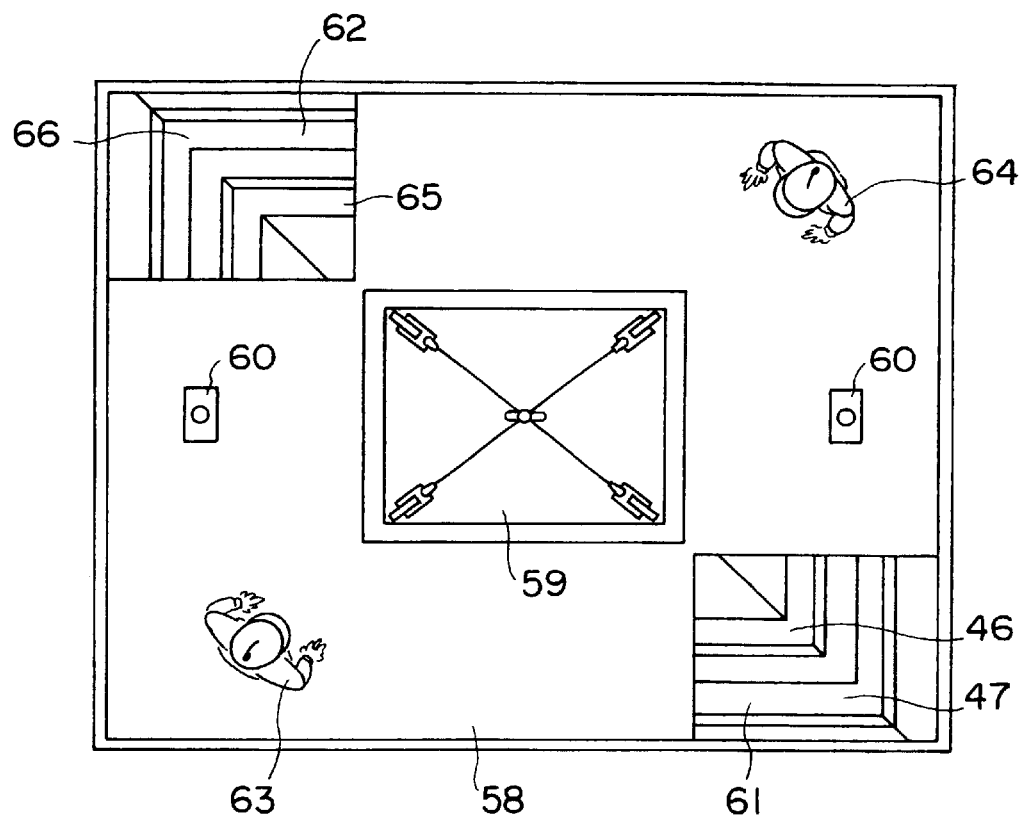
FIG. 6 is a view showing an example of a screen on a monitor TV in a crane operation room.

FIG. 6 shows an example of a screen on the monitor TV in the crane operation room. As views through the TV camera fitted to the crane, there is shown a situation where a picture of the installation unit 59 in the process of its being installed while being suspended by the crane is centered, and pictures 61, 62 imaged by the TV cameras fitted to the helmets of the workers 63, 64 standing by around the unit 59 are synthesized therewith in a state in which the installation unit is developed by trigonometry in the positions where the pictures of the workers who imaged the pictures 61, 62 exist. When the worker moves in the vicinity of the installation unit 59, the position in which to synthesize the picture being imaged by the worker must be simultaneously moved. The picture imaged by the worker is indicated by the name of the worker, and the picture of the worker of which the picture is projected on the TV camera attached to the crane is also indicated by the name of the worker.

The crane operator adds a follow-up label in the helmet position of the worker whose picture is projected in the TV camera attached to the crane, and identifies the worker by reading the label put on the helmet, and adds a name with a follow-up function to the picture of the worker. Alternatively, the picture of the installation unit is synthesized with the picture imaged by the worker by using the self-position information of the self-position measuring device carried by the wide worker and of the self-position measuring device fitted to the installation unit 59.

A distance between the installation unit 38 and the installation unit 39 is obtained from the design data and the projected picture of the installation unit 38 by use of the pictures 61, 62 of the projected workers (A) 40 and (B) 41. The distance and a value of a rotational deviation angle are displayed in superposition on the pictures 61, 62.

Figure 7:
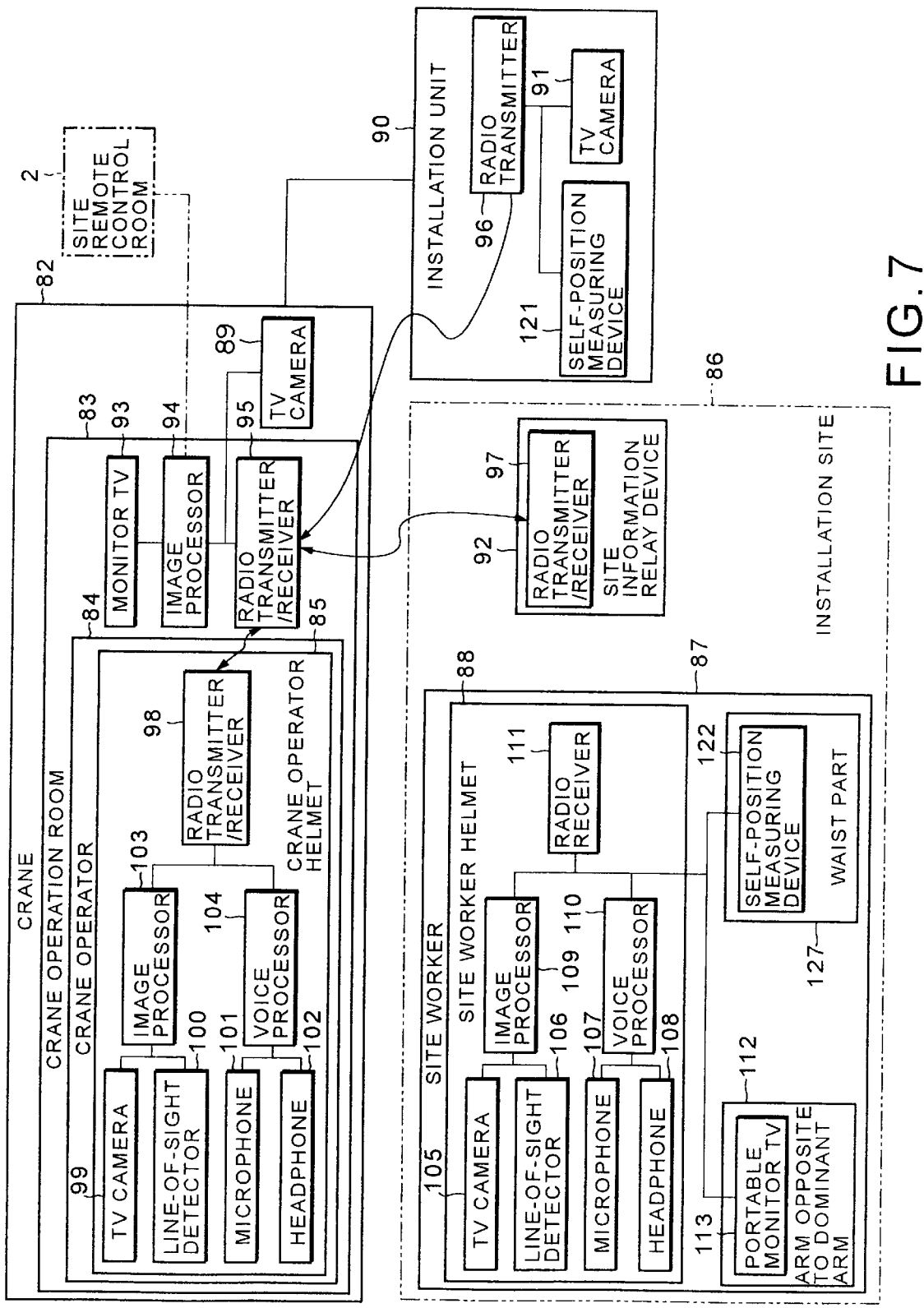
FIG. 7 is a block diagram showing an information transmission system in the picture information shared installation work.

FIG. 7 is a block diagram showing an information transmission system in the picture information sharing installation work according to the present invention. FIG. 7 shows a case of conducting a work of installing a large-size unit by use of a crane 82, wherein the information is transmitted between an installation unit 90, an installation site 86, the crane 821 and the site remote control room 2. A crane operator 84 is stationed in a crane operation room 83 provided in the crane 82, and a site worker 87 putting on a helmet 88 is posted in the installation site 86.

The crane 82 is fitted with a TV camera 92 for imaging the installation unit 90, and the crane operation room 83 is equipped with a monitor TV 93, an image processor 94 and a radio transmitter/receiver 95. An imaging signal of the TV camera is transmitted via a wire to the image processor 94. The radio transmitter/receiver 95 is used for performing the radio transmission/receipt between the installation unit 90 and the installation site 86. Image signals from a TV camera 99 and a line-of-sight detector 100 attached to the helmet 85 of the crane operator 84 are transmitted via an image processor 103 to the radio transmitter/receiver 98. Voice signals of a microphone 101 and a headphone 102 are transmitted via a voice processor 104 to the radio transmitter/receiver 98. The information is wirelessly transmitted and received between the radio transmitter/receiver 98 and the radio transmitter/receiver 95 of the crane operation room 83. A helmet 88 of the site worker 87 is, as in the case of the helmet 85 of the crane operator 84, provided with a TV camera 105 and a line-of-sight detector 106. Image signals from the TV camera 105 and the line-of-sight detector 106 are transmitted via an image processor 109 to a radio transmitter/receiver 111. Voice signals from a microphone 107 and a headphone 108 are transmitted via a voice processor 110 to the radio transmitter/receiver 111. The information is wirelessly transmitted and received between the radio transmitter/receiver 111 and the radio transmitter/receiver 97 of the site information relay device 92. Note that the radio transmitter/receiver 111 is connected to a portable monitor TV 113 attached to an arm 112 opposite to a dominant arm and also to a self-position measuring device 122 attached to a waist part 127. The TV camera 91 incorporated into the installation unit 90 and the self-position measuring device 122 are connected to a radio transmitter 96. The information can be transmitted to the radio transmitter/receiver 95 of the crane operation room 83 from the radio transmitter 96. Various items of information collected by the crane operation room 83 via the radio transmitter/receiver 95 are transmitted via the image processor 94 to the site remote control room 83, and transmitted back to the radio transmitters/receivers 97, 98 each defined as the transmitting side.

Figure 8:
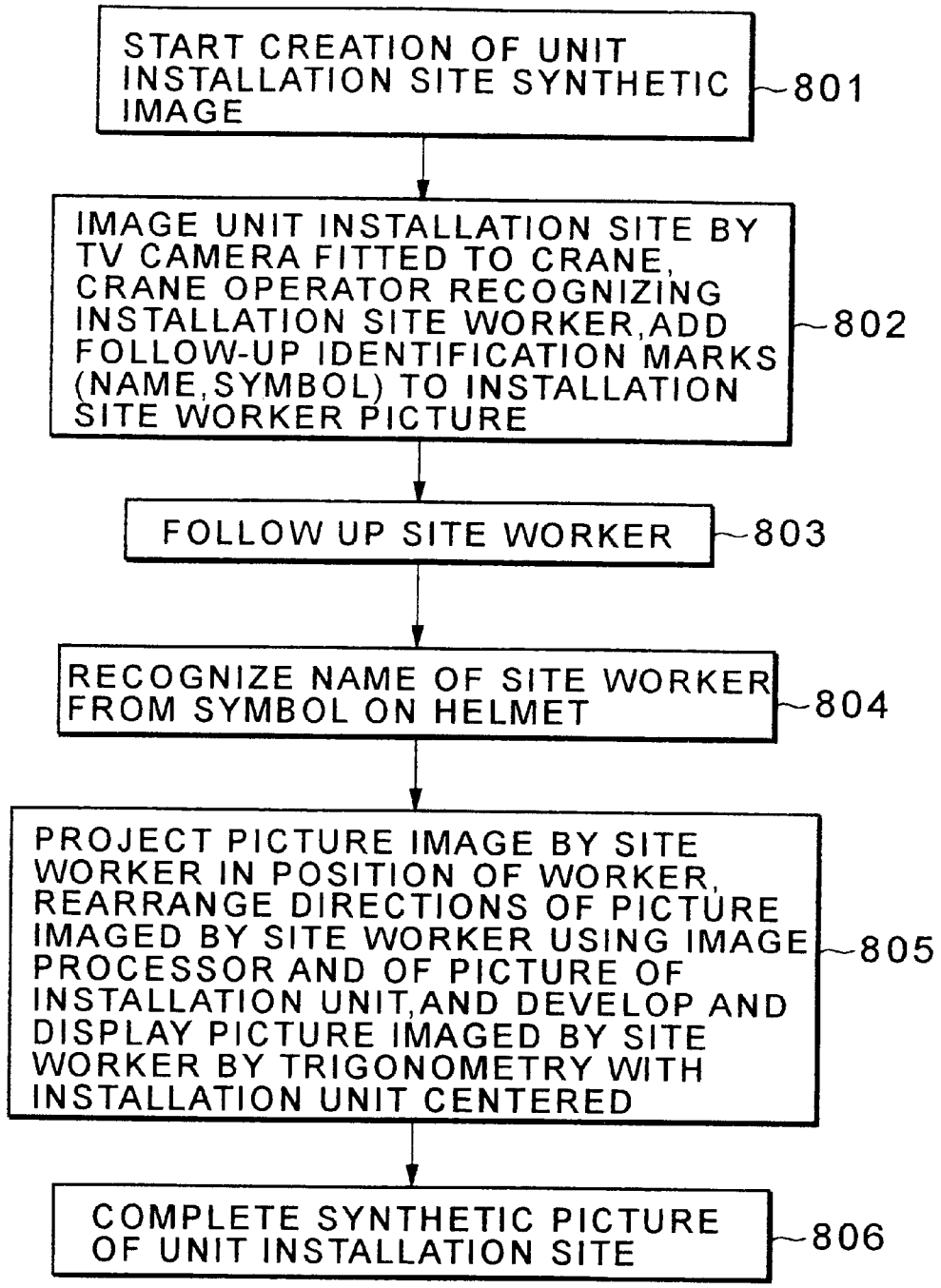
FIG. 8 is a flowchart showing a procedure of creating a synthetic picture relative to a work condition in a unit installation site.

FIG. 8 shows a procedure of creating a synthetic picture relative to a working condition in the unit installation site 86. Upon a start of a step of creating the unit installation site synthetic picture (step 801), the TV camera 92 fitted to the crane 82 begins to image the unit installation site 86, and the crane operator 84 recognizes the installation site worker 87 and adds follow-up identification marks (e.g., a name and an ID number) to the picture of the installation site worker 87 step 802). The site worker 87 is tracked based on the identification marks (step 803), and the name of the site worker is recognized in accordance with an image processing technology based on the mark put on the helmet 88 (step 804). The picture of the site worker 87 is projected in a position of the worker, then the site worker imaging picture and the installation unit picture are rearranged in their directions, and the site worker imaging picture is developed and displayed based on a predetermined plotting method with the installation unit 90 centered (step 805). The synthetic picture of the unit installation site 86 is thus completed (step 806).

Figure 9:
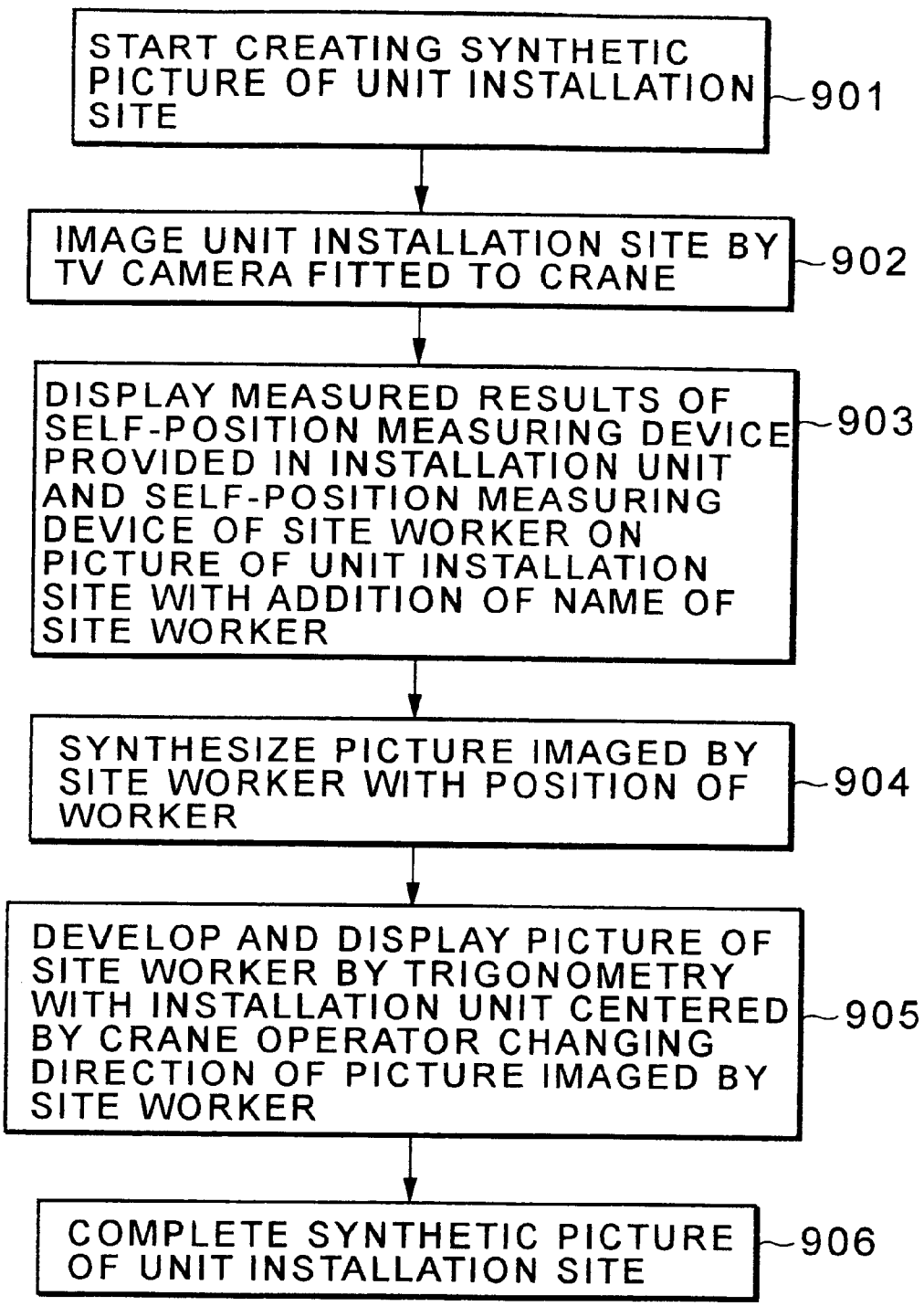
FIG. 9 is a flowchart showing a procedure of creating the synthetic picture relative to the work condition in the unit installation site by utilizing self-position information.

FIG. 9 shows a procedure relative to a working condition of the unit installation site 86 by utilizing the self-position measuring device. When starting a step of creating a unit installation site synthetic picture (step 901), the TV camera 92 fitted to the crane 82 begins to image the unit installation site 86 (step 902), and a measured result of the self-position measuring device 122 carried by the site worker 87 is displayed in the unit installation site imaging picture with an addition of the name of the site worker 87 (step 903). Further, the imaging picture of the sit worker 87 is synthesized in alignment with the position of the worker (step 904). The crane operator 84 changes a direction of the picture imaged by the site worker 87, and the site worker imaging picture is developed and displayed based on a predetermined plotting method with the installation unit 90 centered (step 905). The synthetic picture of the unit installation site 86 is thus completed (step 906).

Figure 10:
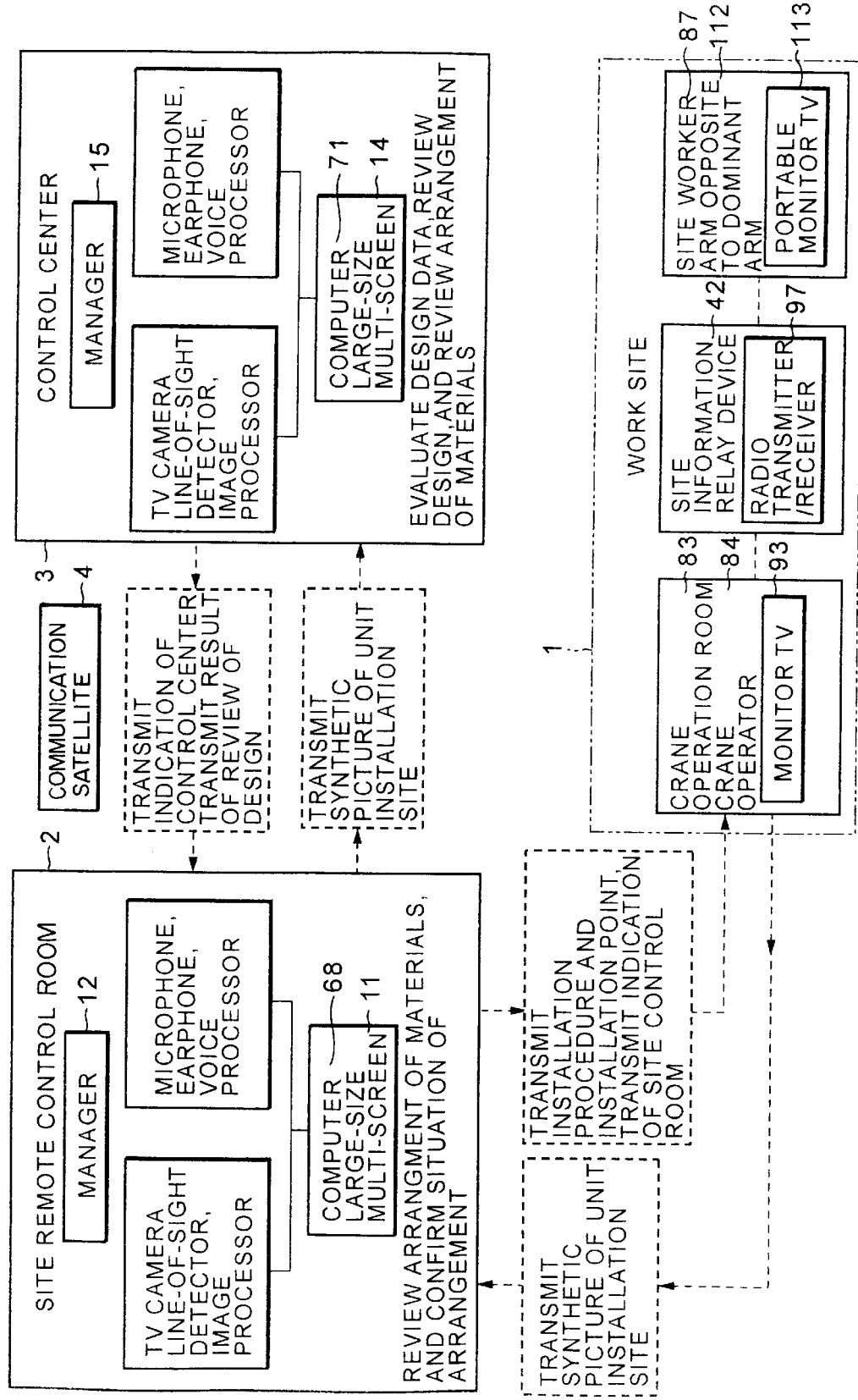
FIG. 10 is a block diagram of an information transmission system in which a cooperative work is performed by transmitting the synthetic picture and voice information obtained in a plant construction method to a site remote control room and a control center.

FIG. 10 is an information transmission block diagram showing a cooperative work performed by transmitting the synthetic picture and the voice information obtained by the plant constructing method of implementing the cooperative work sharing the picture information on the site work, to the site remote control room 2 for remote-controlling the plant constructing site and to the control center 3. The line-of-sight position information and the voice information of the managers 12, 15 of the site remote control room 2 and of the control center 3 are also added to the synthetic picture and the voice information of the unit installation site and then transmitted to their places. The information is transmitted between the site remote control room 2 and the control center 3 via a communication satellite 4. The internal constructions of the work site 1, the site remote control room 2 and the central control room 3 are the same as those described above.

The operation of the present invention will be discussed in greater details with reference to FIGS. 1 to 10 shown above.

Generally in the plant construction, physical distributions are concentrated toward the plant construction site from the peripheral areas, and the construction can be completed in the shortest term of works by gaining a more increased speed of the work as it gets closer to the center. For reducing the construction terms of the plant, it is feasible to reduce a working quantity in the central plant construction site by performing the assembly work up to a stage of the large-size unit in a factory with a favorable working environment, which involves the utilization of a variety of special machines at the peripheral working stages, and the working time can be decreased correspondingly. Besides, a working efficiency can be further enhanced by introducing a measure of supporting a capability of the worker. For example, it is a vital subject to enhance the efficiency of the cooperative work of the site workers with the movement and installation of the large-size unit by use of the crane in the plant construction site.

A minimum unit of the installation work in cooperation with the worker using the crane is based on a method by which one site worker performs the installation work while operating the crane in cooperation with another site worker. The largest unit next to the above is to structure a method of executing the installation with a dedicated operator who operates the crane and two or more site installation workers. According to the working method used so far, the work manager and the preparatory workers are added to the number of workers who do the actual works. According to the present invention, the dedicated work manager is eliminated, the worker serves as the site manager, and the preparatory workers are minimized, or alternatively the cooperative work is conducted by posting no preparatory workers, thereby enhancing the working efficiency as well as saving the labors.

The plant construction site is constructed of the work site 1 using the crane at the plurality of places, and of the site remote control room 2, wherein the information is exchanged the work site 1 and the control room 2 via the permanent wires or wirelessly. Generally, the plant construction site is located geometrically far away from the control center 3. The information exchange between the control center 3 and the plurality of plant construction sites is carried out using the communication satellite 4, which may be defined as a more efficiency system in the case of dealing with a large quantity of picture information in areas where the infrastructure is not yet well prepared.

As one example of a large-size assembly unit, it is assumed that a work of installing the reactor pressure vessel 20 having a weight exceeding 800 tons in the pedestal 21 of the nuclear reactor building 17 by use of the crawler crane 19, is implemented by the workers sharing the picture information. A TV camera 26 fitted to a lower portion of the reactor pressure vessel 20 images a spot of the reactor pressure vessel 20 being installed and also the site workers in the vicinity thereof, and the imaged pictures are wirelessly transmitted to the crane operation room 83. A TV camera fitted to an upper edge of the crawler crane 19 images from above the reactor pressure vessel 20 suspended from the crane 19. The video signal and the voice signal obtained by the site worker 87 and the video signal obtained by the TV camera 26 fitted to the lower portion of the reactor pressure vessel 20, are respectively wirelessly transmitted toward the antenna 74 attached to the upper edge of the crawler crane 19 (FIG. 2). The video signal and the voice signal are transmitted via the wire to the image processor (not shown) installed in the operation room 28 of the crawler crane 19.

The reactor pressure vessel 20 is projected on the monitor TV in the operation room 28 till the vessel 20 passes through a roof aperture 24 of the nuclear reactor building 17 and is lowered while being suspended down to a level position higher than a height of the worker upwardly of the upper edge of the pedestal 21. Then, the operator executes an operation of lowering the reactor pressure vessel 20 while watching the pictures of the installation place and the installation unit which are imaged by the TV cameras 26, 27. Further, meanwhile the operator puts a marks on the virtual workers in the pictures of the site workers as well as on the upper surface of the pressure vessel 20 imaged by the TV camera 27 so that the marks move following up motions of the workers. The operator zooms up the helmet of the worker with the mark and recognizes the name of the worker by reading the mark on the helmet. Based on this recognition, the operator changes the mark into the name of the worker so as to similarly move it following up the worker. The reactor pressure vessel 20, i.e., the installation unit 90 is fitted with a self-position measuring device 121. In the case of the worker 87 carrying a self-position measuring device 122 (FIG. 7), the name of the worker is labeled to the picture f the workers among the pictures of the site workers as well as to the upper surface of the installation unit imaged by the TV camera 27 by use of the self-position information transmitted, thus setting to follow up the picture of the worker.

When the reactor pressure vessel 20 descends down to the level position higher than the height of the site worker upwardly of the upper edge of the pedestal 21 (which is recognized by a sign of a hand of the site worker 87, or judged from the picture imaged by the TV camera 105 of the site worker 87, and further recognized based on a judgement using the self-position information of the self-position measuring device 121 attached to the installation unit 90), the picture of the TV camera 27 is synthesized with the picture imaged by the TV camera 105 fitted to the helmet 88 of the worker standing by along the periphery of the pedestal 21. A synthesizing method is that the TV camera 27 attached to the upper edge of the crawler crane 19 images from above the rector pressure vessel 20 suspended is, with this picture centered, synthesized with the picture imaged by the TV camera 105 attached to the helmet 88 of the site worker standing by along the periphery of the pedestal 21, and this synthetic picture is labeled with the name of the worker and then displayed. This synthetic picture moves following up a motion of the site worker 87. Further, the picture of the reactor pressure vessel 20 is provided with a frame of inhibiting the synthesization so as not to overlap with the picture of the reactor pressure vessel 20.

The operator of the crawler crane 19 cuts a picture in a fixed range on which the attention is paid out of the pictures imaged by the site workers, and pastes it to the picture imaged by the TV camera 27. Further, there is performed an operation of pasting the picture while rotating this picture, which is cut out to synthesize the picture as in the way the three-dimensional body is developed based on the trigonometry and thus displayed. The picture range in which to execute the cutting process is set in a follow-up state in the picture imaged by the site worker. When the self-position measuring device 122 detects that the position of the site worker moves over the fixed range, a position in which to paste the cut-out picture is shifted to a new position of the picture of the site worker. The picture imaged by the site worker is changed over at a fixed interval, and this changeover of the picture is made so as to smoothly move an indication of the line-of-sight position.

The name of the worker who images the picture is indicated in the pasted picture. The picture imaged is pasted as the necessity arises. The line-of-sight position pf the site worker who images the picture is indicated in the pasted picture. The line-of-sight position of the operator of the crawler crane 19 is indicated in the picture of the central pedestal 21 or the pasted picture. The operator of the crawler crane 19 performs the operation of lowering and installing the reactor pressure vessel 20 while watching the picture synthesized with the picture imaged by the site worker, in which the picture obtained by imaging the reactor pressure vessel 20 is centered. The operator gives the site worker an indication to change the imaging place by using the line-of-sight position and the voice as well. The site worker projects the synthetic image on the portable monitor TV 113 fitted to the arm 112 opposite to the dominant arm, and receives an indication of the operator while watching this synthetic picture. The dominant arm is used for effecting a paste auxiliary work involving the use of an instrument. The picture imaged by the site worker is compared with design specification data, then a relative distance to the installation unit is calculated, and a numerical value thereof is indicated in the synthetic picture. The descent of the reactor pressure vessel 20 continues at an allowable maximum velocity with reference to the numerical value given above till the vessel 20 is lowered down to the floor. The synthetic picture of the installation work site is transmitted also to the site remote control room 2 and the control center 3, and the line-of-sight position information on the manager 15 of the control center 3 as well as on the manager 12 of the site remote control room 2, is also transmitted to the operation room 6 of the crawler crane 19. The line-of-sight position information is additionally synthesized with the synthetic picture according to the necessity and respectively used for conveying the indications given from the managers 12,15.

Considered next by way of an example different from the above-mentioned is a case in which for proceeding the works of constructing the building, installing the appliances and excavation in parallel, bases 72, 73 are constructed on the caisson 29, the area under the caisson 29 is excavated while constructing the nuclear reactor building 17 and the turbine building 18 on the bases 72, 73, and the caisson 29 is sunk in accordance with a progress of the excavation, under which method of work the cooperative work of the crane operator with the site workers sharing the picture information is conducted. Besides, what is considered is a case of adopting a system os executing the excavation and carrying out the surplus soil, in which the excavation of the area under the caisson 29 involves the use of the ceiling traveling type excavating device 30 and the crawler type excavating device (not shown), the surplus soil of the excavation is put into the surplus soil carry container 31 which is then lifted above a ground surface 77 by the ceiling cranes 32, 33 through the carry-in/carry-out devices 35, 36 secured to the caisson 29, and the surplus soil is discharged to the surplus soil leaving place by its being loaded into the carrier device 34. Considered also is a case of adopting a construction method by which the caisson 29 is sunk to expand a spacing between support columns 37 in accordance with a progress of the excavation, however, first-floor surfaces 75, 76 of the nuclear reactor building 17 and the turbine building 18 are set flush with the ground surface 77.

When the surplus soil carry container 31 passes through the carry-in/carry-out devices 35, 36, the site workers posted thereabout and wearing the helmets attached with the TV cameras and the line-of-sight detectors conduct slinging works of the ceiling cranes 32, 33. When the surplus soil carry container 31 is mounted in the carrier device 34, the operator, putting on the helmet equipped with the TV camera and the line-of-sight detector, of the carry device 34 performs the slinging works of the ceiling cranes 32, 33. The operation room of the ceiling cranes 32, 33 is provided with the picture information processor for obtaining a synthetic picture by executing a process of synthesizing pictures imaged by the TV cameras 78, 79 fitted to the ceiling cranes 32, 33, pictures imaged by the TV cameras 80, 81 fitted to the surplus soil carry container 31 and pictures imaged by the site workers and the operator of the carrier device 34 with pieces of the line-of-sight position information of the ceiling crane operator, the side workers and the carrier device operator. The synthetic picture obtained herein is transmitted to the monitor TV installed in the operation room of the ceiling cranes 32, 33 and to the portable monitor TVs of the site workers and the carrier device operator. The operator performs the carrying work of the surplus soil carry container 31 while watching the monitor TV in the operation room. The surplus soil carry container 31 and the carrier device 34 are fitted with self-position measuring devices 123, and the site workers and the carrier device operator also carry self-position measuring devices 124. Self-position information given from the self-position measuring devices 123, 124 is transmitted to the ceiling crane operation room and is used when creating the synthetic picture. Further, the self-positions are respectively displayed in the follow-up state in the drawings showing the design specifications, and there are made clear present positions of the appliances relative to the surplus soil carry-out work such as the carrier device, the surplus soil carry container and the ceiling crane. The ceiling crane operator gives a work indication to the persons concerned in accordance with the such positions.

According to the embodiment discussed above, in the work of assembling the large-size unit using the cranes by performing the cooperative work among the plurality of site workers, the appliance operators and the managers, the site workers are smoothly shifted to optimal places to the work object by using the various pieces of picture information and the voice information, thus conveying an intention of the operator. As a result, the crane can be operated while maximizing the operation speed of the crane, whereby an installation work time using the crane can be remarkably reduced. Accordingly, the construction term of this type of plant can be reduced.

Figure 11:
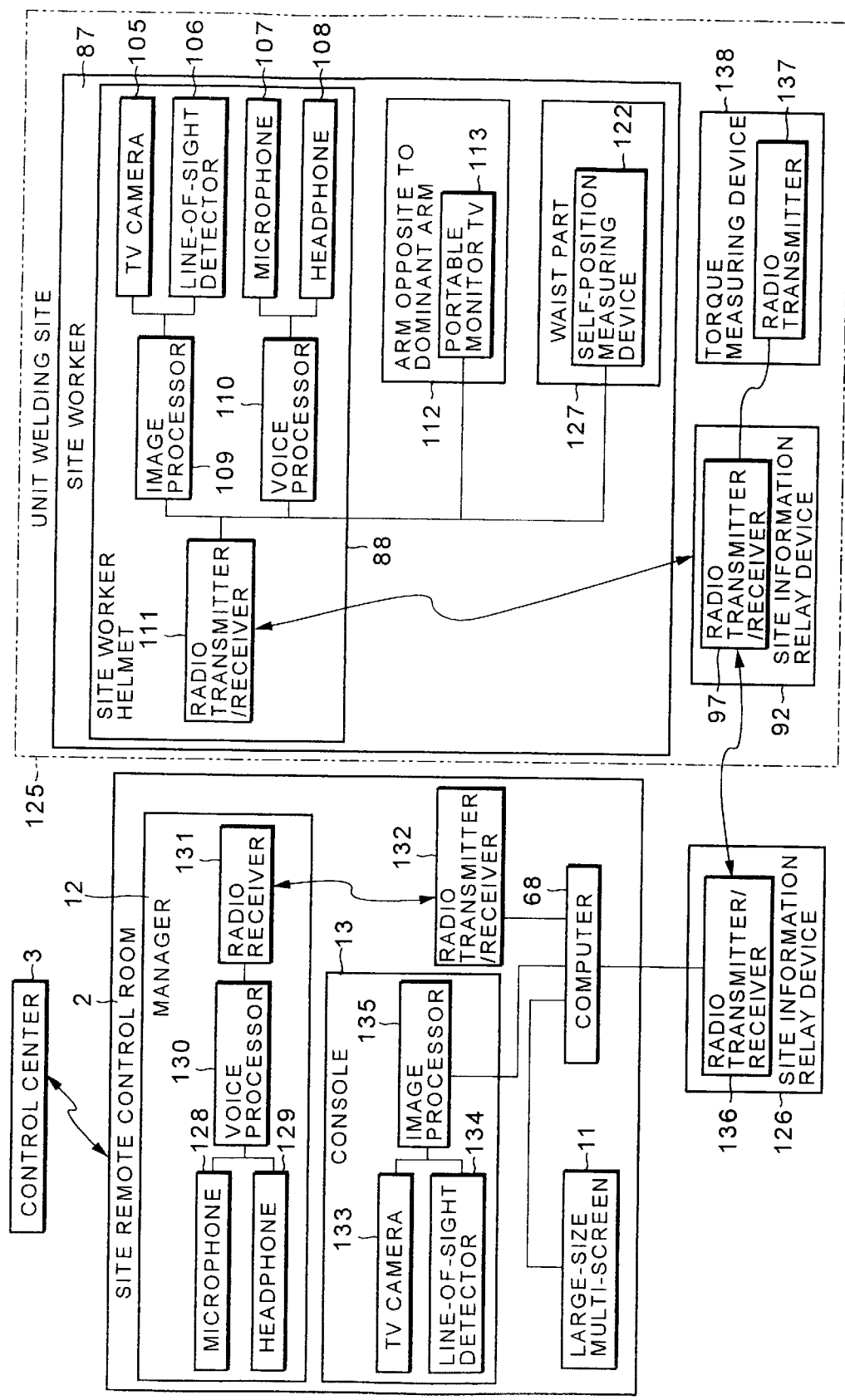
FIG. 11 is a block diagram showing the information transmission system when performing a work of fixing the unit in cooperation by the site remote control room controlling the picture information of the work in the site.

Next, another embodiment will be described with reference to FIG. 11. FIG. 11 is a block diagram showing an information transmission system in the case of fixing the large-size unit by executing a welding process in the cooperative work sharing the picture information between the site remote control room 2 in the plant construction site and a unit welding site 125. The helmet 88 of the site worker posted in the unit welding site 125 is equipped with a TV camera 105, a line-of-sight detector 106, a microphone 107, a headphone 108, an image processor 109, a voice processor 110 and a radio transmitter/receiver 111. Further, an arm 112, opposite to the dominant arm, of the site worker 87 is attached with a portable monitor TV 113, and a waist part 127 thereof is fitted with a self-position measuring device 122. A radio transmitter/receiver 97 of a transportable site information relay device 92 temporarily provided in the welding site, wirelessly transmits and receives the information to and from the radio transmitter/receiver 111 of the helmet 88, and also transmits and receives the information to and from a radio transmitter/receiver 136 of a site information relay device 126 fixedly provided. Note that a torque measuring device 138 will be explained later on.

The operator 12 stationed in the site remote control room 2 provided in the plant construction site is fitted with a microphone 128, a headphone 129, a voice processor 130 and a radio transmitter/receiver 131. The site remote control room 2 is equipped with an console 13, a large-size multi-screen 11, a radio transmitter/receiver 132 and a computer 68. The console 13 includes a TV camera 133, a line-of-sight detector 134 and an image processor 135. Note that the two radio transmitters/receivers 131, 132 mutually wirelessly transmit and receive the information within the site remote control room 2. The computer 68 controls a general data processing function in a control room 12 within the site remote control room 2, and functions as an I/O interface with external appliances. The computer 68 is connected via a cable to the site information relay device 126 disposed in the work site.

In a work of joining the unit in, e.g., a nuclear power plant to an existing structure by welding, a cooperative work of the crane operator with the sit workers is required for moving and aligning the unit by using the crane. Further, after finishing the alignment, a plurality of welding workers perform a fixing work in parallel. When the plurality of workers perform the welding work in parallel, the spots to be simultaneously welded are located evenly along the periphery of the object so that a thermal distortion due to the welding might uniformly occur along the periphery of the fixed object. It is also required that the welding portions be monitored for ensuring a quality of the welding.

In the work of fixing the unit installed by using the large-size crawler crane to an existing structure, the site worker 87 wears the helmet 88 equipped with the TV camera 105, the line-of-sight detector 106, the microphone 107 and the headphone 108, and a self-position measuring device 122 is fitted to a waist part 127 thereof. An arm 112 opposite to the dominant arm is fitted with a portable monitor TV 113, and the dominant arm holds an unillustrated welding device, thus performing the welding work. The picture information, the voice information and the self-position information of the worker 87 are transmitted to the computer 68 in the site remote control room 2 via a transportable site information relay device 126 from the radio transmitter/receiver 111. The computer 68 analyzes the picture information of the welding portion, thus managing a quality of the welding work. Further, a position of the sit worker 87 is obtained from the self-position information of the worker 87, the imaging information of the TV camera 105 and CAD data, and an indication of this position is added onto the CAD data. A picture obtained by synthesizing it with the welding portion picture imaged by the site worker 87, is projected on the multi-screen 11, whereby the manager 12 in the site remote control room 2 manages a condition of the welding work. The computer 68 is stored with, as a data base, a result of analysis about the welded condition and portions in which the welding work has been finished. Created then on the CAD data is a picture to which the indication of the welding-finished portions and an indication of portions on which the welding process is next executed are added. This picture is projected on the multi-screen 11. As for the projection thereof, the picture in a wide range is spatially divided, and the divided fragmental pictures are simultaneously projected in a plurality of large-size multi-screens, or alternatively the spatially-divided pictures are projected while being changed over in time-sequence on one or the plurality of screens.

Transmitted to the unit welding site 125 are voice indication information and a synthetic picture obtained by additionally synthesizing the synthetic picture showing the portions to be welded next with line-of-sight picture information of the manager 12 of the site remote control room 2. The site worker 87 performs the welding work in accordance with a voice indication through the headphone 108 and a picture on the monitor TV 113.

The picture obtained by adding the picture synthesized with the welding portion picture imaged by the site worker 87, the indication of the welding-finished portions on the CAD data and the indication of the portion to be welded next to the CAD data showing the position of the site worker 87, is transmitted from the computer 68 in the site remote control room 2 to a computer 71 in the central control room 3 via the communication satellite 4 (see FIG. 10). At this time, the line-of-sight information and the voice information of the site worker 87 and of the manager 12 in the site remote control room 2, are simultaneously transmitted thereto.

The information of the line-of-sight information of the manager 15 in the control center 3, is additionally synthesized with the synthetic picture with the CAD data centered. This synthetic picture is transmitted to the multi-screens 11, 14 in the site remote control room 2 and the control center 3 as well as to the monitor TV 113 of the site worker 87, thus promptly thoroughly notifying the site worker 87 and the manager 12 in the plant construction site of an indication of the manager 15 in the control center 3. Further, the synthetic picture with the CAD data centered or a corresponding state of the site remote control room 2 is projected on the multi-screen 14 in the control center 3, and the working condition is monitored, thereby making a comparison with a welding process of the design database. In this way, the necessary materials are arranged, and a welding procedure or an operation procedure is evaluated, and the design division is indicated to review the design corresponding to the actual condition and the arrangement of the materials, thus making the review followed by a change in the design of the whole plant.

As discussed above, each of the plurality of welding workers individually wears the helmet equipped with the TV camera, and transmits the picture of the welding portion to the remote control room in the plant construction site, and the quality management of the welding portion is individually conducted online using the picture information, hereby the high-quality welding works can be carried out in parallel. Moreover, the control center in the remote area is capable of recognizing the welding-finished portions on the CAD data, and gives an indication of the portion to be welded next to each individual worker. Then, an efficiency of the whole works is increased by performing the welding works in cooperation, which makes a contribution to a reduction in the construction processes.

An embodiment which will be discussed next is concerned with a working method when fastening a bolt by use of a dedicated fastening tool instead of the welding for fixing the unit in the device shown in FIG. 11. A torque measuring device 138 is provided for measuring a fastening torque when fastening the bolt, information on the fastening torque of the dedicated fastening tool is transmitted via a radio transmitter 137 to a radio transmitter/receiver 97 of a transportable site information relay device 92, and further transmitted therefrom to the computer 68 in the site remote control room 2 via a fixedly-provided site information relay device 126. In accordance with this embodiment, the fastening work is conducted by using the dedicated fastening tool as a substitute for the welding work performed by the plurality of site workers using the welding machine. In this case, a fastening torque of the bolt is measured by the torque measuring device 138, and the quality management is done through a management of the fastening torque.

The wire worker 87 wearing the helmet 88 equipped with the TV camera 105 transmits the picture of the site of the fastening work using the dedicated fastening tool and the torque measured value to the site remote control room 2 in the plant construction site, whereby the quality management of the fastening work is conducted online. The high-quality fastening work can be thereby implemented in parallel, which contributes to reduce the construction processes by enhancing the working efficiency of the whole plant.

Further, still another embodiment will be explained. Referring to FIG. 2, the bases 72, 73 are constructed on the caisson 29, the area under the caisson 29 is excavated while constructing the nuclear reactor building 17 and the turbine building 18 on the bases 72, 73, and the caisson 29 is sunk in accordance with a progress of the excavation and further sunk by expanding a spacing between the support columns 37. The expansion of the spacing between the support columns 37 involves the use of a spacing adjusting tool (not shown) for adjusting the spacing to a predetermined value. In such a case, the actual spacing is judged, based on an indicated torque of the spacing adjusting tool, to be excessive or deficient with respect to the predetermined value of spacing.

When the caisson 29 is sunk, the site worker 87 wearing the helmet 88 equipped with the TV camera 105 and the line-of-sight detector 106 and carrying the self-position measuring device 122, stands by per support column 37 for expanding the spacing. Transmitted to the computer 68 in the site remote control room 2 are a picture of the spacing adjusted portion between the support columns 37 which is imaged by the site worker 87, the line-of-sight position information and self-position information of the site worker 87, a torque quantity of the spacing adjusting tool and a spacing measured quantity. These pieces of information are synthesized with the CAD data, thereby creating a synthetic picture. This synthetic picture is transmitted and projected on the multi-screen 11 in the site remote control room 2 and on the monitor TV 113 of the worker 87 himself or herself.

The manager 12 in the site remote control room 2 adds the voice, the line-of-sight position/numerical value to the synthetic picture, and gives an operational instruction to expand the spacing between the support columns 37 through the indication on the monitor TV 113 fitted to the arm 112 opposite to the dominant arm 112 as well as through the head phone 108 of the site worker 87. The site worker 87 implements the operation of adjusting the spacing between the support columns 37 by manipulating the spacing adjusting tool while watching the monitor TV 113. The operator of the ceiling crane indicates the object position with which the operator has a concern by moving the line-of-sight position display on the synthetic picture and simultaneously gives a voice indication, whereby the site worker is moved to a place optimal to the surplus soil container 31 to image a desired picture. The intention of the operator is thus immediately conveyed. In this way, the ceiling crane can be operated by maximizing the operation velocity of the ceiling crane, and a reloading time of the surplus soil container 31 can be thereby reduced using the ceiling crane.

What is claimed is:

1. A method of assembling a plant in which a plurality of workers communicate with each other in order to assemble said plant, comprising:

a step of making each of a crane operator in a crane operation room and a site worker in a plant construction site equipped with a picture I/O device and a voice I/O device, the crane operator being provided for helping to assemble said plant;

a step of performing a work of assembling said plant while the crane operator shares picture information of said picture I/O device and voice information of said voice I/O device with the site worker;

a step of connecting a site remote control room proximal to the plant construction site to a host control center via a radio transmission path; and a step of assembling said plant while the site worker, the crane operation room, the site remote control room and the control center share the picture information and the voice information of their own with each other, wherein the assembling of said plant is conducted based on the picture information and the voice information.

2. A method of communicating between workers according to claim 1, further comprising:

a step of making each of head parts of the crane operator and of the site worker fitted with a TV camera and a line-of-sight detector as said picture I/O devices and also said voice I/O device;

a step of attaching said TV camera to a crane for work to image from above a unit to be assembled;

a step of synthesizing line-of-sight position displays of the crane operator and of the site worker with a picture imaged by said TV camera fitted to the crane for work and a picture imaged by the site worker; and a step of performing the assembling work using the voice information and the line-of-sight position information while sharing the synthesized picture information with each other.

3. A method of communicating between workers according to claim 2, further comprising:

a step of making each of the crane operator and the site worker wear a helmet;

a step of fitting to the helmet said voice I/O device including said TV camera and said line-of-sight detector and said voice I/O device including a microphone and a headphone; and a step of thus performing the assembling work.

4. A method of communicating between workers according to claim 2, further comprising:
   a step of obtaining a synthetic picture by synthesizing the picture imaged by said TV camera fitted to said crane with a picture imaged by the site worker; and
   a step of performing the assembling work by sharing the synthetic picture between a monitor TV in the crane operation room and a portable monitor TV attached to an arm opposite to a dominant arm of the site worker.

5. A method of communicating between workers according to claim 2, further comprising:
   a step of displaying the synthesized picture information as a synthetic picture, in the same layout as developing a three-dimensional body by a trigonometry and displaying this body, of a picture imaged by said TV camera fitted to the head part of the site worker with a picture imaged by said TV camera fitted to said crane with this picture centered, in a position where the site worker is originally projected.

6. A method of communicating between workers according to claim 5, wherein the operator of said crane puts a follow-up indication on the site worker projected in the synthetic picture in such a state that the operator is able to follow up the site worker, and
   the operator identifies the worker in the picture by reading an identification indication put on the site worker.

7. A method of communicating between workers according to claim 5, further comprising:
   a step of of setting a picture within a fixed range in the follow-up state among the pictures imaged by the site workers; and
   a step of synthesizing the picture in the follow-up state range with the picture imaged by said TV camera fitted to said crane.

8. A method of communicating between workers according to claim 2, wherein the picture imaged by the site worker is changed over at a fixed interval or by a change indication with respect to the synthetic picture in which the picture imaged by the site worker is laid out with the picture imaged by said TV camera fitted to said crane being centered, and
   the indications of the line-of-sight positions of the site worker and of the crane operator are smoothly shifted.

9. A method of communicating between workers according to claim 2, wherein a picture is set in such a range as to be cut out of the picture imaged by said TV camera fitted to said crane so as to fix a projection range of the picture in which said crane is going to install an installation unit with respect to the synthetic picture in which the picture imaged by the site worker is laid out with the picture imaged by said TV camera fitted to said crane being centered.

10. A method of communicating between workers according to claim 2, wherein a name or a mark of the site worker is synthesized with the picture imaged by said TV camera fitted to the head part of the site worker in the synthesized picture information.

11. A method of communicating between workers according to claim 2, wherein a name or a mark of the site worker is synthesized with the picture of the site worker in the synthesized picture information.

12. A method of communicating between workers according to claim 2, further comprising:
   a step of calculating a distance between a fixed-side and a moving side of said unit being installed, a parallel movement deviation quantity within the plane and a rotational deviation quantity from the picture imaged by said TV camera fitted to the head part of the site worker in the synthesized picture information; and
   a step of making use of the calculation quantity for at least one of a display for enabling the calculation quantity to be used for operating said crane and automatic control of said crane.

13. A method of communicating between workers according to claim 1, further comprising:
   a step of providing line-of-sight detectors for detecting line-of-sight positions of the manager of the site remote control room and the manager of the control center;
   a step of synthetically displaying the line-of-sight positions detected by said two line-of-sight detectors on the synthetic picture of the plant construction site; and
   a step of synthetically displaying the line-of-sight positions on the design data transmitted from the control center.

14. A method of communicating between workers according to claim 13, wherein the picture imaged by the site worker is changed over at a fixed interval or by a change indication with respect to the synthetic picture in which the picture imaged by the site worker is laid out with the picture imaged by said TV camera fitted to said crane being centered, and
   the indications of the line-of-sight positions of the site worker, the crane operator and the manager are smoothly shifted.

15. A method of communicating between workers according to claim 1, wherein the site worker carries a self-position measuring device, and
   said plant is assembled sharing self-position information of the site worker together with the picture information and the voice information.

16. A method of communicating between workers according to claim 1, further comprising:
   a step of fitting said self-position measuring device to said installation unit handled by said crane;
   a step of making the site workers carry said self-position measuring devices; and
   a step of synthetically displaying the picture imaged by the site worker with the picture imaged by said TV camera fitted to said crane being centered by use of the self-position information obtained by said two self-position measuring devices.

17. A method of communicating between workers according to claim 16, further comprising:
   a step of setting a picture within a fixed range in the follow-up state among the pictures imaged by the site workers; and
   a step of synthetically displaying the picture in the follow-up state range with the picture imaged by said TV camera fitted to said crane.

18. A method of assembling a plant in which a plurality of workers communicate with each other in order to assemble said plant, comprising
   a step of equipping a welding worker in a plant construction site with a picture I/O device, a voice I/O device and a self-positioning measuring device, the welding worker being provided for helping to assemble said plant;
   a step of performing a welding work in the plant construction site while the welding worker shares picture information of said picture I/O device, voice information of said voice I/O device and self-position measurement information from said self-position measuring device with a site remote control room vicinal to the plant construction site;

a step of connecting the site remote control room vicinal to the plant construction site to a host control center via a radio transmission path; and a step of conducting the welding work in the plant construction site while the welding worker, the site remote control room and the control center share the picture information and the voice information of their own with each other wherein the welding work for assembling the plant is conducted based on the picture information and the voice information.

19. A method of assembling a plant in which a plurality of site workers communicate with each other in order to assemble said plant, comprising a step of equipping each of the plurality of site workers conducting an assembling work in cooperation by use of fastening tools with a picture I/O device, a voice I/O device and a self-positioning measuring device;

a step of performing the assembling work in the plant construction site while the site workers share picture information of said picture I/O device, voice information of said voice I/O device and self-position measurement information from said self-position measuring device with a site remote control room vicinal to the plant construction site;

a step of connecting the site remote control room vicinal to the plant construction site to a host control center via a radio transmission path; and a step of conducting the assembling work in the plant construction site while the site workers, the site remote control room and the control center share the picture information and the voice information of their own with each other, wherein the assembling work for assembling the plant is conducted based on the picture information and the voice information.

\* \* \* \* \*